United States Patent
Rastogi (12)

(10) Patent No.: US 6,723,362 B1
(45) Date of Patent: Apr. 20, 2004

(54) PRODUCTS AND METHOD FOR FORMING LARGER SHRIMP, SEAFOOD, MEAT, AND OTHER PRODUCTS FROM PLURAL SMALLER PRODUCTS

(76) Inventor: Ram Krishna Rastogi, 9, Ocean View Layout, Visakhapatnam - 3, AP (IN)

( * ) Notice: Subject to any disclaimer, the term of this patent is extended or adjusted under 35 U.S.C. 154(b) by 201 days.

(21) Appl. No.: 09/687,045

(22) Filed: Oct. 13, 2000

(51) Int. Cl.⁷ .......................... A22C 29/03; A22C 25/00
(52) U.S. Cl. ........................................ 426/274; 426/643
(58) Field of Search ................................. 426/643, 274, 426/296

(56) References Cited

U.S. PATENT DOCUMENTS

| | | | |
|---|---|---|---|
| 3,780,196 A | | 12/1973 | Domecki |
| 4,092,435 A | * | 5/1978 | Teijeiro ...................... 426/296 |
| 4,341,800 A | * | 7/1982 | Lester ............................ 426/1 |
| 4,411,917 A | * | 10/1983 | Chang ........................ 426/104 |
| 4,474,823 A | * | 10/1984 | Nishikawa et al. .......... 426/513 |
| 4,759,937 A | * | 7/1988 | Spector ....................... 426/274 |
| 4,816,276 A | * | 3/1989 | Blazevich ................... 426/479 |
| 4,824,687 A | * | 4/1989 | Yasuno ....................... 426/104 |
| 4,855,158 A | * | 8/1989 | Kawana ....................... 426/513 |
| 4,900,570 A | * | 2/1990 | Matsubara .................. 425/542 |
| 4,919,957 A | | 4/1990 | Ikeuchi et al. |
| 5,431,938 A | | 7/1995 | Kou |
| 5,827,558 A | | 10/1998 | Corser et al. |
| 5,846,586 A | | 12/1998 | Sawyer |

* cited by examiner

Primary Examiner—Carolyn Paden
(74) Attorney, Agent, or Firm—O'Connell Law Firm

(57) ABSTRACT

A method for forming larger shrimp, seafood, and meat products from plural smaller products and the products of that method. A butterflied larger shrimp product formed from plural smaller food products can be created with a first child shrimp interposed between first and second butterfly halves of a mother shrimp. A peeled-round larger shrimp product formed from plural smaller products can be created with a distal end of a peeled-round mother shrimp joined to a proximal end of a peeled-round first child shrimp. In such a case, the joined ends of the mother and first child shrimp can be sloped at complementary angles. A shell-on larger shrimp product formed from plural smaller products can be created with a distal end of a shell-on mother shrimp joined to a proximal end of a shell-on first child shrimp. In such a case, the distal end of the first food product and the proximal end of the second food product can be correspondingly shaped in a male/female conical arrangement whereby a cone of the conical arrangement can matingly join with a conical depression of the conical arrangement for joining the first and second food products.

44 Claims, 4 Drawing Sheets

PRODUCTS AND METHOD FOR FORMING LARGER SHRIMP, SEAFOOD, MEAT, AND OTHER PRODUCTS FROM PLURAL SMALLER PRODUCTS

FIELD OF THE INVENTION

The present invention relates generally to the processing of shrimp, seafood, and meat products. Stated more particularly, disclosed and protected by the present patent is a method for forming larger shrimp, seafood, and meat products by coupling plural smaller products and to the resulting larger products formed by that method.

BACKGROUND OF THE INVENTION

One knowledgeable in the art of food processing techniques will be well aware that larger food products often have higher value per unit weight than their smaller counterparts. The higher value of larger food products of course derives from their being more desirable to consumers. Although this is true of a number of meats and types of seafood, possibly nowhere else is the value differential more pronounced than relative to shrimp, which of course is a most popular seafood delicacy. Accordingly, the present discussion will focus primarily on the processing of shrimp with it being explicitly noted that the invention is equally applicable to a plurality of other food products.

As the astute reader may surmise from the foregoing, shrimp are commercially available in a wide range of sizes. They are commonly sorted into groups of similar size and then sold according to the number of shrimp required to form one pound of the seafood product. This number is commonly referred to as the count of the shrimp. At one end of the spectrum, shrimp as small as in the 500 count range have been found to be commercially useful while fully-grown tropical shrimp weighing one-third of a pound effectively establish the opposite end of the spectrum.

Although shrimp defining these ends of the spectrum are available, shrimp are most commonly commercially sold ranging from roughly a 16 count to approximately a 150 count. Shrimp between a 30 count and a 150 count typically are sold for normal consumption. However, shrimp in the 16 count to 25-count range are normally considered "Jumbo" shrimp such that they are considered a particular delicacy. With this, the Jumbo shrimp are exceptionally desirable to consumers. Disadvantageously, Jumbo and other larger size shrimp are significantly less common than their smaller counterparts. This is true relative to ocean caught specimens and also relative to those raised in shrimp farms. Taken in combination with their natural desirability, the rarity of larger and Jumbo-sized shrimp causes them to merit a premium price per unit weight.

As one would expect in light of the added value per unit weight of larger shrimp and their relative rarity as compared to smaller shrimp, a number of inventors have endeavored to craft larger shrimp or shrimp-simulating structures often from plural smaller shrimp and sometimes from other food products. Although their methods and resulting products have differed widely, these inventors have worked toward the common goal of increasing the value per unit weight of smaller shrimp or other food product by simulating or roughly approximating larger shrimp of a lower count.

One common type of prior art method for forming larger shrimp has begun by first grinding small shrimp product or other food product into a coarse or fine paste. Then, the ground product is extruded or formed into a simulation of a larger shrimp. The 1990 U.S. Pat. No. 4,919,957 to Ikeuchi et al. may be considered exemplary of such processes. There, minced fish material is injected into a split mold that has a cavity in the shape of a shelled shrimp. Then, a V-shaped device makes a longitudinal groove in the minced fish material. Finally, the mold and the material are heated to yield the shrimp-shaped food product.

Unfortunately, shrimp-shaped products formed according to such methods suffer from a number of shortcomings. As one might expect, the resulting product, although having a shape similar to that of a large shrimp, has a markedly different texture than solid shrimp that makes its composition easily discernible and often tactilely offensive. Furthermore, the shrimp-shaped products typically have a significantly different appearance than solid shrimp because, for example, the separate minced pieces can be visually perceived unless the shrimp-shaped product is prepared in a breading or the like. Still further, such molding or extruding processes can not practically produce a tail-on shrimp where, as its name would suggest, the actual tail is left on the shrimp.

A second method commonly practiced by the prior art has been to couple two or more pieces of shrimp together to create a larger mass of shrimp that arguably belongs to a class of lower count shrimp. One such method was disclosed by Kou in U.S. Pat. No. 5,431,938. There, Kou taught making a composite seafood product by assembling plural smaller butterflied shrimp, with all but one being tailless, into a structure resembling a single, large butterflied shrimp. The resulting structure can then be battered and fried to obscure the fact that plural smaller shrimp have been joined. Corser et al. discloses another representative method in U.S. Pat. No. 5,827,558 wherein a centerpiece substrate shrimp with its tail on and cut into a butterfly configuration is surrounded by a second shrimp in the shape of a ring.

Disadvantageously, the larger products produced by these types of methods also exhibit a number of shortcomings. For example, such processes typically demand that the shrimp to be coupled be cut into a butterfly configuration such that the resulting shrimp can not be prepared to simulate larger shrimp of other configurations such as shell-on tail wherein only the head is removed from a shrimp or peeled round where the shell is removed from the tail. Just as importantly, such processes yield products that, although they comprise a larger resulting structure, do not have the appearance of an actual large shrimp. For example, unless the resulting structure is battered and fried or otherwise coated, the multiple different smaller shrimp can be readily perceived by a consumer as being separate pieces. This is particularly true since the joined shrimp typically have different muscular orientations.

Also, the shapes of the resulting structures often bear little resemblance to the shapes of actual larger shrimp. Additionally, the resulting products normally must be blast frozen to maintain their configuration and then must be cooked prior to thawing to prevent their coming apart. Even further still, cutting the component shrimp into the necessary configurations results in appreciable losses in food product. Yet further, the relative sizes of the component shrimp must be chosen carefully for the process to be possible. Finally, such processes typically require specialized equipment including, most basically, specialized trays and the like.

In light of the foregoing discussion relative to the art of shrimp processing, it becomes clear that there remains a need for an improved method for creating larger shrimp and other food products from a plurality of smaller shrimp or other food products. Indeed, one skilled in the art will appreciate that a method for processing shrimp and other food products that provides a solution to each of the above-described deficiencies exhibited by the prior art while demonstrating a number of heretofore unrealized advantages thereover would comprise a marked advance in the art.

SUMMARY OF THE INVENTION

Advantageously, the present invention sets forth with the broadly stated object of meeting the needs left by the prior art while providing a number of heretofore unrealized advantages thereover.

Stated more particularly, a most basic object of the present invention is to provide an improved method for forming larger shrimp, seafood, and meat products by coupling plural smaller products and to the resulting larger products formed by that method.

A more particular object of the invention has been to provide a process and product thereof that yields a larger shrimp from plural smaller shrimp that is essentially imperceptibly different in appearance, texture, and taste as compared to an actual larger shrimp.

An underlying object of the invention is to increase the value per unit weight of shrimp products by converting shrimp of a relatively high count range to shrimp of a lower count range.

A further object of the invention is to provide a process and resulting product that accomplishes the foregoing objects relative to shrimp prepared in a number of different methods including butterflied, peeled round, and headless, shell-on.

Yet another object of the invention is to provide a product and a process for forming that product that can be carried out in an efficient and cost effective manner with little or no waste.

An additional object of the invention is to provide a product and a process for forming larger food products that can be employed with constituent components of substantially any relative size relationship.

One should note that these and still further objects and advantages of the present invention would be obvious not only to one who has had an opportunity to review the present disclosure but also to one who has an opportunity to experience a product deriving from the present invention.

In accomplishing these objects, one most basic embodiment of the invention comprises a butterflied larger shrimp product formed from plural smaller food products. The larger shrimp product is founded on a mother shrimp with a proximal end and a distal end prepared in a butterfly configuration by a dorsal butterfly slit along a portion of a centerline of the mother shrimp wherein the mother shrimp has a first butterfly half disposed on an opposite side of the centerline from a second butterfly half. A distal portion of the centerline is split, and at least a distal portion of the first and second butterfly halves are separated from one another to form an open area. A first child product is disposed in the open area between the first and second butterfly halves and is joined with the mother shrimp. With this, the mother shrimp and first child product are joined in a coplanar arrangement and the mother shrimp and the first child product together form a butterflied larger shrimp.

The first child product could be crafted from a number of materials including a shrimp product that has been prepared in a butterfly configuration with first and second butterfly halves coupled along a centerline. In such a case, the centerline of the first child product preferably will be generally aligned with the centerline of the mother shrimp. To achieve still larger resulting shrimp, the first child product could be supplemented by second and possibly further child shrimp.

The open area between the first and second butterfly halves of the mother shrimp could have the shape of a wedge of a given size. Also, the first child product could comprise a wedge-shaped product with a size approximately equal to the size of the open area between the first and second butterfly halves. In certain embodiments, the first child product could be quasi-T-shaped with first and second legs and a wedge-shaped base. The base could comprise the wedge-shad product disposed between the first and second butterfly halves, and the first and second legs of the quasi-T-shaped first child product could overly the distal ends of the first and second butterfly halves of the mother shrimp. With this, the resulting food product will have not only a length but also a width that is greater than those of the original mother shrimp.

The mother shrimp and the first and any other child products preferably are joined by an edible binder or bonding agent. The edible binder or bonding agent can be chosen from the group consisting of guar gum, locust bean gum, Carrageenan gum, pectin, gum arabic, gum acacia, agar, cellulose derivatives such as carboxymethyl cellulose, cornstarch, potato starch, wheat starch, tapioca, egg albumen, cereals, dextrose, heat-coagulable proteins, thrombin mixed with black plasma (fibrinogen), which is commonly sold under the trademark FIBREMIX by FNA Foods, Inc. of Calgary, Canada, water, alginates, and a combination of thrombin and blood plasma.

One must note that the present method is also applicable to non-butterflied shrimp. For example, a single larger shrimp can be prepared in a peeled-round configuration by first preparing the mother shrimp by de-heading, de-veining, and de-shelling except for its tail and then leaving the mother shrimp in the round. A first child shrimp is similarly prepared except that its tail is removed. The distal end of the mother shrimp is then cut to create a first angled surface, and the proximal end of the first child shrimp is cut to a second angled surface. Ideally, the first and second angled surfaces are cut to complementary angles such that the mother and first child shrimp are property aligned end to end as would be the case with an actual larger shrimp. With this, the mother and first child shrimp properly cooperate in an end-to-end relationship as first and second complementary shrimp segments respectively. Again, the mother and first child shrimp could be supplemented by additional children shrimp.

Even further, the present invention could be applied to headless, shell-on shrimp. In such a case, a mother shrimp, preferably frozen, is prepared by being de-headed but left with substantially the entire shell on. However, a distal volume of shrimp meat is exposed as during the removal of the head of the mother shrimp or by the removal of the distal-most shell segment of the mother shrimp. Then, the distal end of the mother shrimp is cut to form a cone of shrimp meat. The first child shrimp, preferably frozen, is prepared by first de-heading and de-tailing a second shrimp and then forming a conical depression in the proximal end of the first child shrimp. Then, the mother shrimp is joined with the first child shrimp by a binder or bonding agent to establish a mutually complementary relationship. Further child shrimp can be added. Preferably, the mother and the first and any further child shrimp are chosen to have progressively increasing size whereby the realistic appearance of a single larger shrimp is further improved. However, it should be clear that, although a cone-shaped mating arrangement presently seems preferable, it is well within the scope of the invention to craft the mother and child shrimp with other mating arrangements. A primary goal is to provide an increased area of surface contact between the mother and child shrimp thereby to enabling a secure bonding therebetween.

One will appreciate that the foregoing discussion broadly outlines the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

As is the case with many inventions, the present invention for a method for forming larger shrimp, seafood, and meat products from plural smaller products and the products of that method can assume a wide variety of embodiments. However, to assist those reviewing the present disclosure in understanding and, in appropriate circumstances, practicing the present invention, certain particularly preferred embodiments of the method and resulting products will be described hereinafter.

Looking more particularly to the drawings, a butterflied larger shrimp formed according to the present invention is indicated generally at 10. There, one sees that the butterflied larger shrimp 10 is formed by the coupling of a mother shrimp 12 with a first child shrimp 14, which are coupled in a coplanar, complementary, edgewise relationship. It should be made clear that, although in FIG. 1 one can see the exterior line along which the mother shrimp 12 and the first child shrimp 14 are coupled, in practice such a line would be at most marginally visible even absent any coating, breading, frying, or other potentially masking materials or practices. Of course, although it is not necessary for masking or bonding purposes, it is well within the scope of the invention for the larger shrimp 10 to be coated, breaded, fried, or otherwise treated.

It should also be clear that, in this disclosure, the term coplanar is intended to mean on a single level. Coplanar is not meant in its literal sense of being disposed in a single plane. Stated alternatively, within this disclosure, the mother and first child shrimp 12 and 14 are termed coplanar because they are not stacked atop one another. Instead, they are joined in an edgewise relationship on the same, single level. Of course, it is possible and within the scope of the present invention to stack additional food products, which may be shrimp products, atop the coplanar mother and first child shrimp 12 and 14 in this and in any other embodiment of the present invention.

Figure 1:
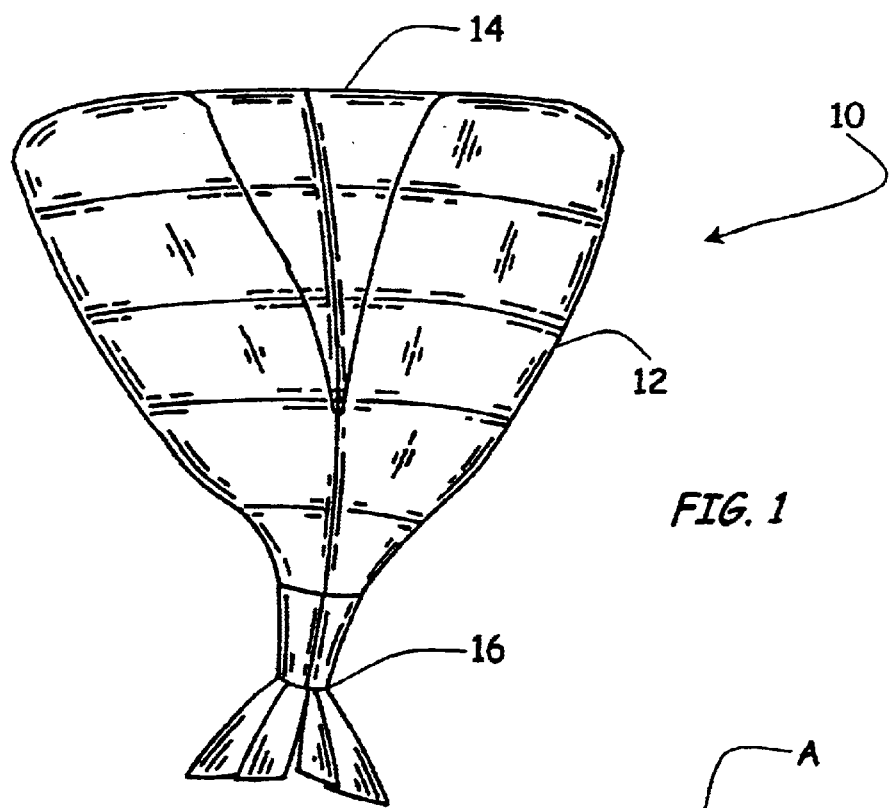
FIG. 1 is a top plan view of a butterflied larger shrimp formed from plural butterflied smaller shrimp according to the present invention.
Figure 2:
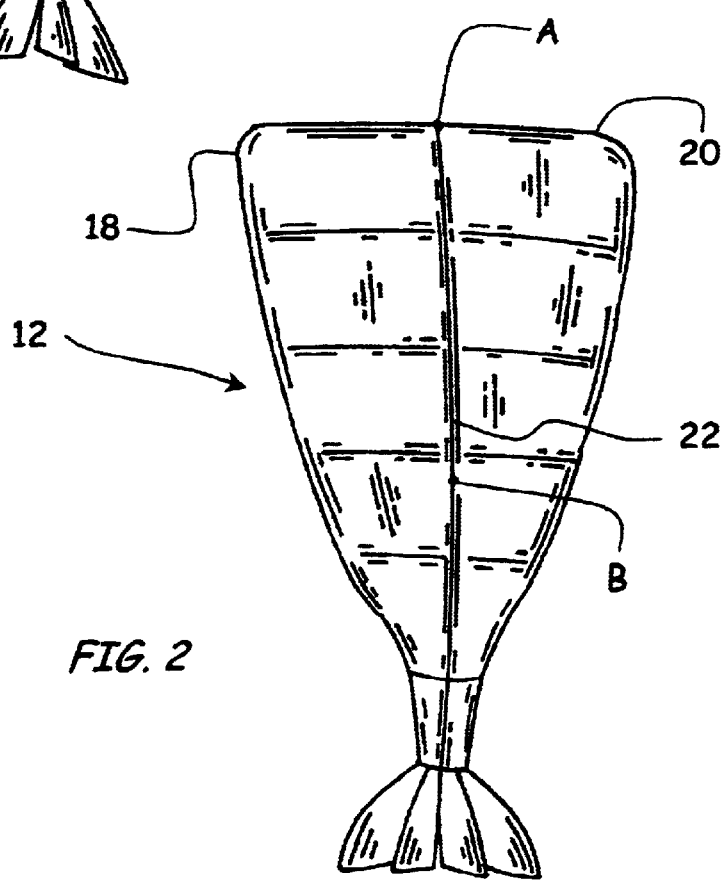
FIG. 2 is a top plan view of a butterflied mother shrimp prior to splitting and prior to coupling with a butterflied child shrimp as in FIG. 1.

The butterflied mother shrimp 12 of FIG. 1 is again shown in FIG. 2. There, the butterflied mother shrimp 12 is depicted prior to its being split and coupled with the first child shrimp 14. As one skilled in the art will appreciate, to achieve the configuration depicted in FIG. 2 the mother shrimp 12 would be de-headed, de-shelled, de-veined, and butterflied by making a dorsal butterfly slit along a portion of the sagittal plane or centerline 22 of the mother shrimp 12. The butterfly slit does not extend completely through the mother shrimp 12 to the ventral side thereof thereby slicing the mother shrimp 12 into a first butterfly half 18 a second butterfly half 20. The first butterfly half 18 is roughly symmetrical to the second butterfly half 20, and the two are disposed on opposite sides of the centerline 22. Preferably, although not necessarily, the mother shrimp 12 has its tail shell 16 left on as is conventionally the case with butterflied shrimp.

Figure 3:
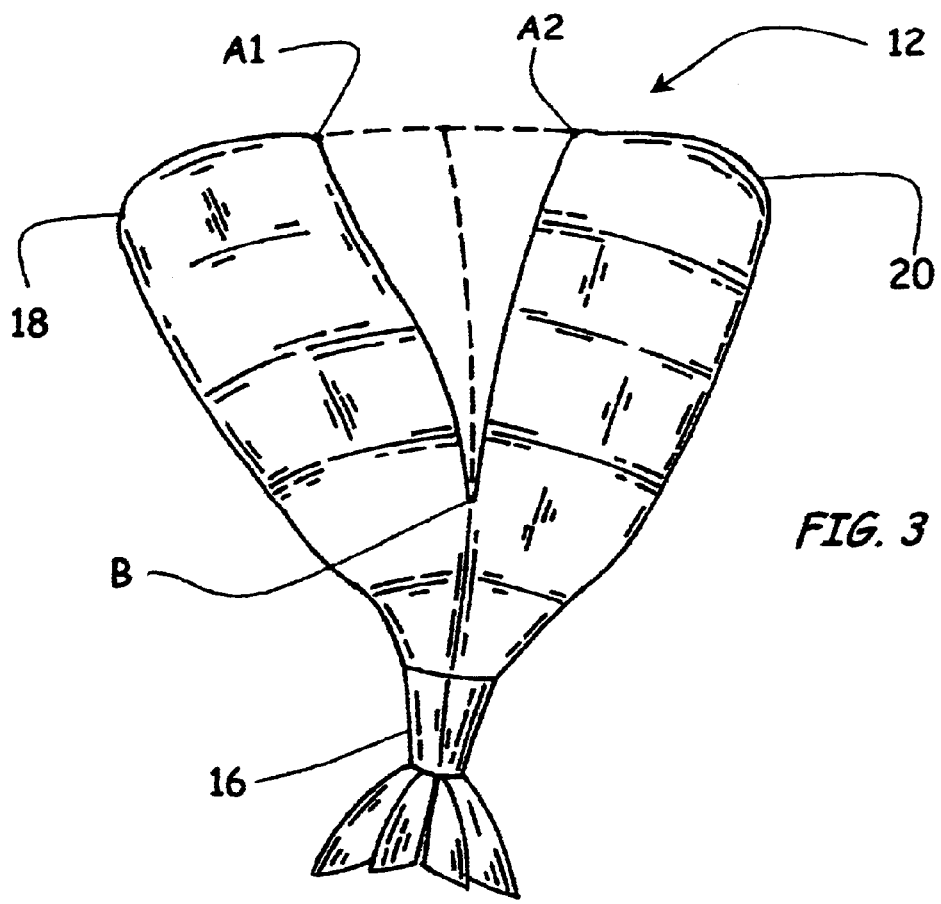
FIG. 3 is a top plan view of the butterflied mother shrimp after being split and parted according to the present invention.

With the butterflied mother shrimp 12 prepard as shown in FIG. 1, it can be sliced a into the split configuration shown in FIGS. 1 and 3. To do so, the mother shrimp 12 would be cut along the centerline 22 from the most distal point A to the point B, which is disposed proximally along the centerline 22. With this, the point A is split into the subparts A1 and A2, and the first and second butterfly halves 18 and 20 can be spread apart as is shown in FIG. 3.

Of course, one will appreciate that the butterflying step and the splitting step could be performed generally simultaneously. To do so, one practicing the invention would slice through the mother shrimp 12 from the dorsal to the ventral sides thereof along the centerline 22 from point A to point B and en the practitioner would partially retract the knife or other cutting implement (not shown) and continue the cutting motion along the centerline 22 without cutting entirely through to the ventral side of the mother shrimp 12 thereby completing the butter flying process.

The first child shrimp 14 is also de-headed, de-shelled, de-veined, and butterflies by making a dorsal butterfly cut along a portion of the sagittal plane or centerline 28 of the first child shrimp 12. As with the mother shrimp 12, the butterfly slit does not extend completely through the first child shrimp 12 to the ventral side thereof. With this, the first child shrimp 14 can be spread apart to yield a first butterfly half 24 a second butterfly half 26. Again, the first butterfly half 24 is roughly symmetrical to the second butterfly half 20, and the two are disposed on opposite sides of the centerline 28. Unlike the mother shrimp 12, however, the first child shrimp 14 has its tail shell 16 removed. With the first child shrimp 14 so prepared, it will have an effective length extending from point C, the most distal end of the centerline 28, to point D, the most proximal end of the centerline 28.

Figure 4:
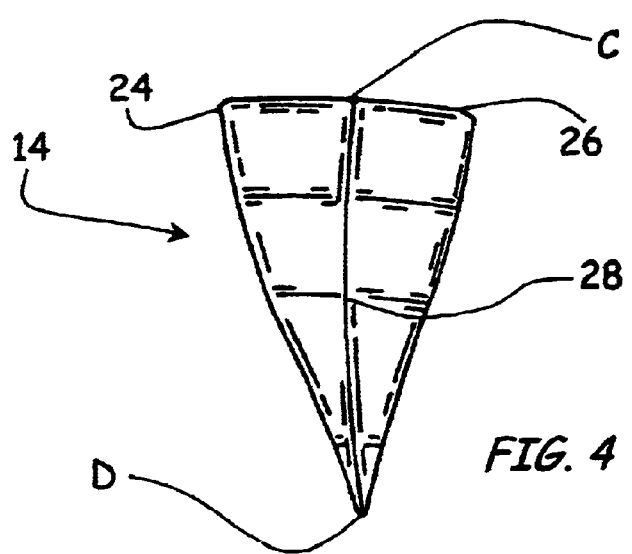
FIG. 4 is a top plan view of a butterflied first child shrimp prior to coupling with the butterflied mother shrimp as in FIG. 1.

With the mother shrimp 12 and the first child shrimp 14 configured as in FIGS. 3 and 4, respectively, they can be joined as is shown in FIG. 1. To do so, the centerline 28 of the first child shrimp 14 ideally is aligned with the centerline 22 of the mother shrimp 12 such that the point D along the centerline 28 of the first child shrimp 14 is disposed adjacent to the point B along the centerline 22 of the mother shrimp 12. With this, the mother shrimp 12 and the first child shrimp 14 may be respectively considered to be first and second complementary shrimp members since, when so coupled together, they unite to simulate accurately the appearance of an actual larger butterflied shrimp. Although it is not expressly shown, it should be appreciated that one could split the first child shrimp 14 into halves along its centerline 28, and one of these halves could be coupled with the mother shrimp 12 under the foregoing method instead of the entire first child shrimp 14.

It will be recognized that the relative sizes of the mother shrimp 12 and the first child shrimp 14 could be varied widely within the scope of the invention such that the size of the resulting single larger shrimp 10 also could vary widely while remaining within the present invention's scope. One possible method for carrying out the invention with substantially no waste could be to choose and prepare the mother and first child shrimp 12 and 14 so that, when properly prepared into the wedge shape of FIG. 4, the first child shrimp 14 can be matingly received into the triangular gap between the first and second butterfly halves 18 and 20 of the mother shrimp 12 with the distal end of the first child shrimp 14 neither being shorter than nor extending beyond the distal ends of the first and second butterfly halves 18 and 20. With this, the ideal first child shrimp 14 will have a length along its centerline 28 from point C to point D that is approximately equal to the length of the dotted portion of the centerline 22 of the mother shrimp 12, which is equal to the original distance between points A and B in FIG. 2 before the mother shrimp 12 was sliced and the first and second butterfly halves 18 and 20 were spread apart.

One will appreciate, then, that the length of the first child shrimp 14 and the length of the wedge-shaped opening formed in the mother shrimp 12 preferably are mutually dependent on one another. With this, one could form the larger shrimp 10 by first choosing and preparing a mother shrimp 12 and then choosing and preparing a first child to shrimp 14 that would appropriately fill the triangular gap in the mother shrimp 12. Alternatively, one could choose and prepare the first child shrimp 14 and then choose and prepare the mother shrimp 12 and the gap therein to receive the first child shrimp 14. However, what may be considered the most likely scenario is that those who become skilled in practicing the present invention will be able to employ their experience to choose properly sized mother and first child shrimp 12 and 14 simultaneously and then prepare the mother and first child shrimp 12 and 14 as described herein.

In this preferred embodiment, the mother shrimp 12 and the first child shrimp 14 are coupled by a binder or bonding agent disposed between their contacting surfaces. Ideally, the binder or bonding agent entirely covers the contacting surfaces. To do so, one or both of the mother and first child shrimp 12 and 14 could be dipped in the binder or bonding agent or only the contacting surfaces of either or both of the mother and first child shrimp 12 and 14 could be coated with the binder or bonding agent by a brush or similar article. Advantageously, the binder or bonding agent unites the mother and first child shrimp 12 and 14 into a single structure comprising the single larger shrimp 10.

Provided it is safely edible, the type of binder or bonding agent used is of little consequence to the invention. The binder or bonding agent could be organic, inorganic, or a combination of plural types of binders or bonding agents. If necessary, the binder or bonding agent could be applied once or a plurality of times to achieve most effective bonding. As one skilled in the art would be well aware, among the binders and bonding agents that could be used are guar gum, locust bean gum, Carrageenan gum, pectin, gum arabic, gum acacia, agar, cellulose derivatives such as carboxymethyl cellulose, cornstarch, potato starch, wheat starch, tapioca, egg albumen, cereals, dextrose, heat-coagulable proteins, alginates, a combination of thrombin and blood plasma, and the like. However, it should be noted that it is theoretically possible that, by exploiting the inherent cohesive character of the mother and first child shrimp 12 and 14, a thin coating of water alone could act as a suitable binder material. Therefore the use of water as an edible binder also is contemplated by this invention.

The single larger shrimp 10 produced by the above-described coupling of the mother shrimp 12 and the first child shrimp 14 achieves a number of advantages. Most basically, the single larger shrimp 10 is markedly bigger than each of the mother and first child shrimp 12 and 14 whereby the single larger shrimp 10 is of a lower count than each of the contributing mother and first child shrimp 12 and 14. With this, when forming a part of the single larger shrimp 10, the meat comprising the mother and first child shrimp 12 and 14, which were of a notably higher count than the single larger shrimp 10, enjoys a significantly higher value per unit weight whereby economic advantage is gained.

Fortunately, the single larger shrimp 10 does not merely comprise a larger mass of shrimp meat. Instead, it accurately replicates the shape, appearance, and texture of an actual larger butterflied shrimp. This is in marked opposition to the products resulting from the methods disclosed by the prior art. For example, by being constructed from real shrimp that is not ground or minced, the single larger shrimp 10 has the same texture when felt with one's hands and when chewed as would an actual shrimp of the same size. Also, as first and second complementary pieces, the mother and first child shrimp 12 and 14 cooperate to simulate the shape of an actual larger butterflied shrimp accurately. This is a notable improvement over prior art coupling-type methods where, for example, first and second shrimp were merely mounted on top of one another as in U.S. Pat. No. 5,431,938 to Kou, or where unnaturally shaped structures were created as in U.S. Pat. No. 5,827,558 to Corser et al. where a centerpiece shrimp is surrounded with a ring/wrap piece shrimp and in U.S. Pat. No. 5,846,586 to Sawyer where shrimp bodies are piggy-backed on top of one another. The realistic appearance of the single larger shrimp 10 is even further improved by the generally coplanar alignment of the centerlines 22 and 28 of the mother and first child shrimp 12 and 14. Further still, by joining the mother and first child shrimp 12 and 14 with an edible binder, their junctions would be substantially imperceptible even without the surface of the single larger shrimp 10 being coated, fried, or otherwise obscured.

It must be clear that the mother shrimp 12, which comprises a first complementary shrimp segment, and the first child shrimp 14, which comprises a second complementary shrimp segment, could be prepared in a number of ways depending on the particular advantage desired to be gained. What is desirably the case, however, is that the first complementary shrimp segments the mother shrimp 12, the second complementary shrimp segment, the first child shrimp 14, and any other complementary shrimp segment add together to achieve the three-dimensional shape of the single larger shrimp 10. With this, while certain presently preferred possibilities are disclosed herein, it will be appreciated that a number of possibilities are possible within the scope of the invention.

Figure 5:
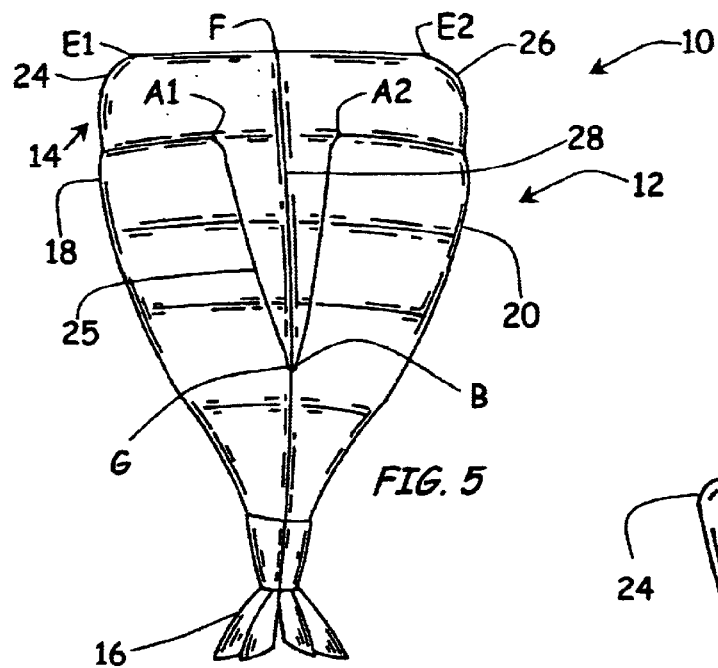
FIG. 5 is a top plan view of an alternative embodiment of a butterflied larger shrimp formed from plural butterflied smaller shrimp according to the present invention.
Figure 6:
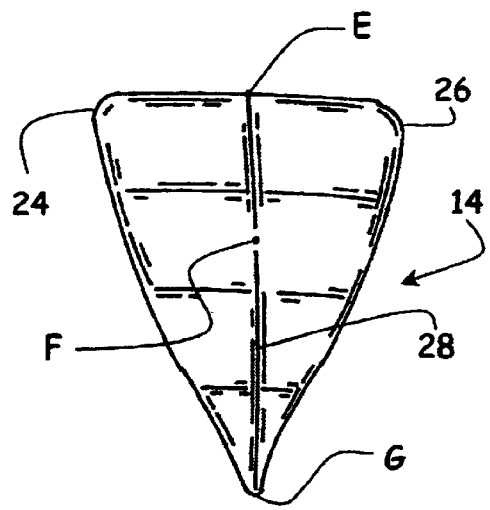
FIG. 6 is a top plan view of a butterflied smaller shrimp prior to splitting and prior to coupling with a butterflied larger shrimp as in FIG. 5.

One such possibility is depicted in FIG. 5 where the butterflied mother shrimp 12 is not merely widened by its coupling with the first child shrimp 14 but it is also lengthened. To do so, the mother shrimp 12 is prepared substantially as in FIGS. 1 and 3. The first child shrimp 14 is again de-headed, de-shelled, de-veined, and butterflied, and the tail is again removed. Then, the first child shrimp 14 is formed into the quasi-T configuration shown in FIG. 5 where the T-shaped first child shrimp 14 has first and second legs 24 and 26 that respectively overly the distal ends of the first and second butterfly halves 18 and 20 and a wedge-shaped base 25 that fills the gap between the spread first and second butterfly halves 18 and 20. One will note that it is the wedge-shaped base 25 that causes the first child shrimp 14 to be quasi-T-shaped and not simply T-shaped.

To form the first child shrimp 14 into the quasi-T shape of FIG. 5, the first child shrimp 14 would be cut entirely therethrough along its centerline 28 from point E to point F thereby allowing the distal ends of the first and second butterfly halves 24 and 26 to be spread apart and point E to be split into points E1 and E2. Most preferably, the mother shrimp 12 and the first child shrimp 14 will be chosen and prepared such that the distance between points F and G on the first child shrimp 14 equals the length of the split along the centerline of the mother shrimp 12, which equals the distance between points A and B, plus the thickness of the first and second legs 24 and 26 of the T-shaped first child shrimp. Also, the preferred single larger shrimp 10 will be formed with the distance between points E1 and E2 equaling the combined width of the first and second halves 18 and 20 of the mother shrimp 12 plus the amount that the first and second halves 18 and 20 are spread apart. With such a configuration, the resulting single larger shrimp 10 will accurately simulate the three-dimensional shape of an actual larger shrimp of similar size.

Figure 7:
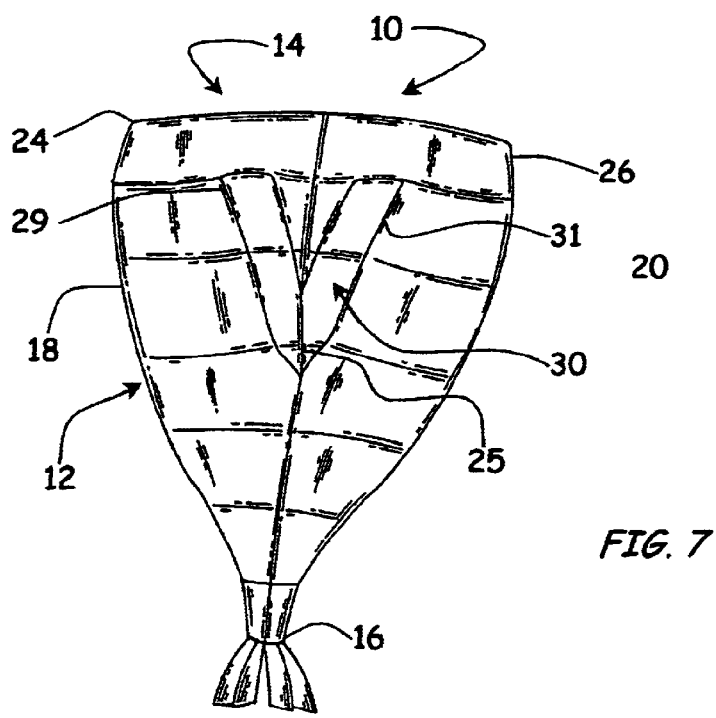
FIG. 7 is a top plan view of another alternative embodiment of a butterflied larger shrimp formed from plural butterflied smaller shrimp according to the present invention.

One will appreciate, of course, that the single larger shrimp 10 could be formed by the coupling of more than just a first complementary shrimp segment such as the mother shrimp 12 and a second complementary shrimp segment such as the first child shrimp 14. For example, a single larger shrimp 10 could be constructed with three or more complementary shrimp segments as is shown in FIG. 7 where three complementary shrimp segments 12, 14, and 30 comprising the mother shrimp 12, the first child shrimp 14, and a second child shrimp 30 are joined to form the single larger shrimp 10. There, the mother shrimp 12 is again prepared as in the first and second embodiments, and the first child shrimp 14 is prepared in a manner similar to the embodiment of FIG. 5. However, the second child shrimp 30, which has been formed into a generally V-shaped configuration, is interposed partially between the mother shrimp 12 and the first child shrimp 14 to add to the overall size of the single larger shrimp 10.

The formation of the second child shrimp 30 is substantially similar to the formation of the first child shrimp 14 in the embodiment of FIG. 5 The second child shrimp 30 is de-headed, de-shelled, de-veined, butterflied, and its tail shell removed. Furthermore, the second child shrimp 30 is partially split at its distal end to allow the first and second halves 29 and 31 to be separated. With this, the second child shrimp 30 assumes the V-shaped configuration of FIG. 7.

With the second child shrimp 30 so prepared, the mother shrimp 12, the first child shrimp 14, and the second child shrimp 30 are joined by a suitably chosen binder or bonding agent in the arrangement of FIG. 7 where the second child shrimp 30 is inserted into the V-shaped opening in the mother shrimp 12 and the V-shaped base of the quasi T-shaped first child shrimp 14 is inserted into the V-shaped opening in the second child shrimp 30 and the first and second legs 24 and 26 of the first child shrimp 14 overly the distal ends of the first and second butterfly halves 18, 20, 24, and 26 of the mother shrimp 12 and the second child shrimp 30.

In light of the foregoing, one will appreciate that, although the above-described configurations of the mother and first and second child shrimp 12, 14, and 30 are presently preferred, the mother shrimp 12, the first child shrimp 14, and any other children shrimp could be joined according to the invention in virtually an infinite number of ways. What is desired in any of these configurations is that the mother shrimp 12, the first child shrimp 14, and any additional children shrimp be prepared and joined in such that they act as complementary segments that together accurately simulate the funnel shape of a butterflied single larger shrimp 10. In doing so, at least some of the joined shrimp should be coupled in what may be termed a coplanar arrangement in that the joined shrimp are not mounted on top of one another but instead are coupled in a side-by-side or end-to-end arrangement in what may be considered for convenience a single plane. The shapes and orientations of the complementary segments shown herein, although uniquely advantageous for the reasons set forth and alluded to herein, could be varied significantly within the scope of the present invention. To be still more complete, one should note that these coplanar shrimp could be supplemented by non-coplanar shrimp if necessary or desirable for the accurate replication of a larger shrimp. For example, additional non-coplanar shrimp could be mounted atop the coplanar shrimp for thickening the resulting single larger shrimp 10.

Even further still, it should be appreciated that the first child shrimp 14 and any other complementary segments contributing to the simulation of a single larger shrimp 10 could possibly be crafted from non-shrimp products including other crustacean, seafood, meat, and vegetable products. For example, one or more of the complementary segments could be formed from scallops, crab meat, chicken, steak, vegetable, and any one of a number of other products. Accordingly, it will be clear that the use of such non-shrimp food products is well within the scope of the present invention.

Figure 8:
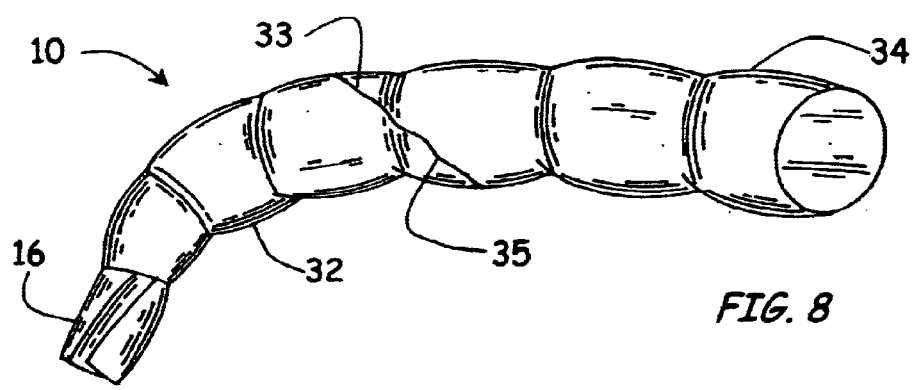
FIG. 8 is a view in side elevation of a larger peeled round tail-on shrimp formed from plural smaller peeled round shrimp according to the present invention.

Advantageously, the present method is also applicable to non-butterflied shrimp. This is first exemplified in FIG. 8. There, a mother shrimp 32 is coupled to a first child shrimp 34 to simulate a single larger shrimp 10 that has been prepared in a peeled-round configuration. As in earlier embodiments, the mother shrimp 32 has been prepared by being de-headed, de-veined, and de-shelled except for its tail 16. However, the mother shrimp 32 is left in the round. The first child shrimp 34 is similarly prepared except that its tail has been removed. The distal end of the mother shrimp 32 is then cut to create a first angled surface 33, and the proximal end of the first child shrimp 34 is cut to a second angled surface 35. Ideally, the first and second angled surfaces 33 and 35 are cut to complementary angles such that the mother and first child shrimp 32 and 34 are properly aligned end to end as would be the case with an actual larger shrimp. With this, the mother and first child shrimp 32 and 34 properly cooperate in an end-to-end relationship as first and second complementary shrimp segments respectively. To maintain the mother and first child shrimp 32 and 34 in the depicted arrangement, the first and second angled surfaces 33 and 35 are joined by an edible binder or bonding agent. Although not preferable, it is possible that the proximal end of the first child shrimp 34 might not need to be cut to present an angled end surface. This might be done, for example, where a perfect alignment between the mother and first child shrimp 32 and 34 is not required.

Figure 9:
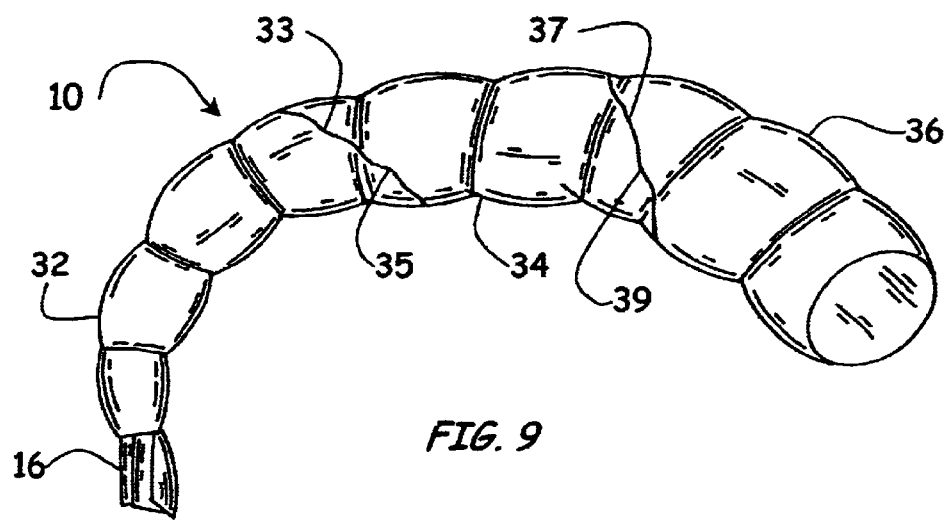
FIG. 9 is a view in side elevation of an alternative embodiment of a larger peeled round tail-on shrimp formed from plural smaller peeled round shrimp.

As with the earlier embodiments of the invention, the mother and first child shrimp 32 and 34 could be supplemented by additional children shrimp. Such an embodiment is shown in FIG. 9. There, the mother and first child shrimp 32 and 34 are prepared and joined as in the embodiment of FIG. 8. However, the mother and first child shrimp 32 and 34 are supplemented by a second child shrimp 36 the proximal end of which is joined to the distal end of the first child shrimp 34 by an edible binder or bonding agent. To do so, the distal end of the first child shrimp 34 is cut to create a third angled surface 37, and the proximal end of the second child shrimp 36 is cut to a fourth angled surface 39. The third and fourth angled surfaces 37 and 39 are preferably cut to complementary angles so that the mother, first child, and second child shrimp 32, 34, and 36 are joined in a consistent end-to-end relationship to act properly as first, second, and third complementary shrimp segments. Preferably, the mother, first child, and second child shrimp 32, 34, and 36 are chosen to have progressively increasing size whereby the realistic appearance of a single larger shrimp is further improved.

Figure 10:
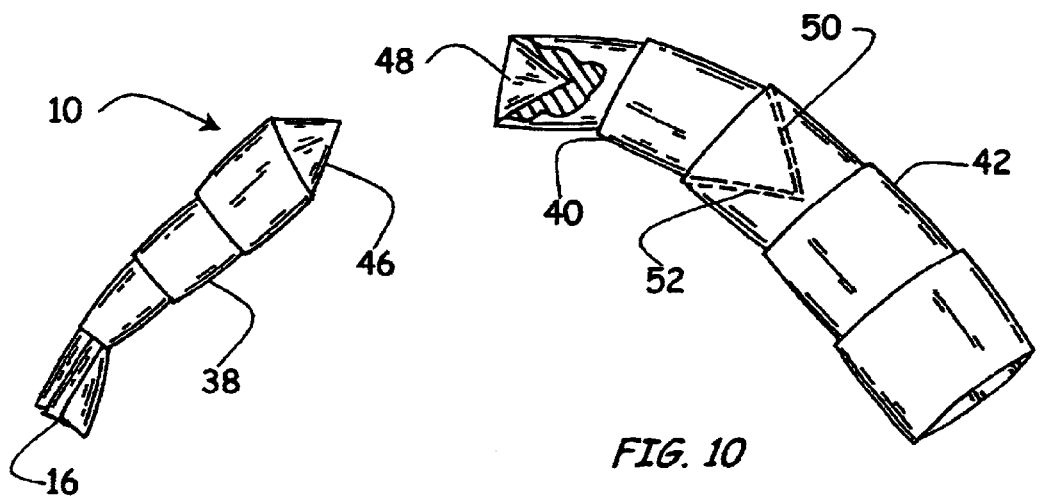
FIG. 10 is a view in side elevation of a larger headless shell-on shrimp formed from plural smaller shell-on shrimp according to the present invention.

Finally, FIG. 10 illustrates the present method's further applicability to headless, shell-on shrimp. There, a mother shrimp 38 is prepared by being de-headed but left with substantially the entire shell on. However, with the mother shrimp 38 preferably frozen, a distal volume of shrimp meat is exposed as during the removal of the head (not shown) of the mother shrimp 38 or by the removal of the distal-most shell segment of the mother shrimp 38. Then, the distal end of the mother shrimp 38 is cut to form a cone 46 of shrimp meat. The first child shrimp 40, preferably frozen, is prepared by first de-heading and de-tailing a second shrimp and then forming a conical depression 48 in the proximal end of the first child shrimp 40. Then, the mother shrimp 38 is joined with the first child shrimp 40 by coating or dipping one or both of the cone 46 and the conical depression 48 with a binder or bonding agent and then placing the two in contact thereby securely joining the mother shrimp 38 and the first child shrimp 40 in a mutually complementary relationship.

Advantageously, by employing the conical or other angular, mating contacting faces 46 and 48, the area of surface contact between the mother and first child shrimp 38 and 40 is increased thereby ensuring a solid coupling therebetween. It should be clear, however, that the cone 46 and conical depression 48 are designed merely to provide that increased area of surface contact. Accordingly, one will appreciate that a wide variety of other mating configurations could be employed that would be well within the scope of the invention.

In a similar manner, a cone 50 is formed from the meat at the distal end of the first child shrimp 40, and a conical depression 52 is formed in the meat at the proximal end of a second child shrimp 42 that has been prepared by de-heading and de-tailing. The first and second child shrimp 40 and 42 are then joined by applying a binder or bonding agent to either or both of the cone 50 and the conical depression 52. Again, the preferred mother, first child, and second child shrimp 38, 40, and 42 are chosen to have progressively increasing size whereby the realistic appearance of a single larger shrimp is further improved.

As was noted previously, the present disclosure focuses primarily on the formation of larger shrimp products from plural smaller shrimp products merely by way of example. The present invention can be employed to similar advantage relative to other food products. For example, a large piece of steak, such as a large filet mignon, could be crafted from plural smaller pieces of steak thereby increasing the value of the constituent pieces and yielding a larger steak product that is in many respects imperceptibly different than a naturally grown steak product of similar size. Likewise, one could employ the invention to create larger fish filets, larger chicken pieces, and still other larger food products formed from plural smaller products.

From this disclosure, one will note certain aspects of the present invention that contribute to its functionality and further differentiate it from the prior art. One aspect that can be perceived from the foregoing disclosure is that, in each embodiment, the constituent food products that make up the larger food product have been essentially coplanar and coextensive with one another. For example, the mother and child shrimp 12 and 14 of the first embodiments are essentially joined at their edges to maintain their dorsal and ventral sides in an essentially coplanar configuration. This is in marked deviation from the food products formed by the prior art where, for example, shrimp are mounted atop one another to make a thickened but unrealistic appearing resulting food product. Further differentiating the invention from the prior art is that the constituent products are arranged in a complementary manner to allow the resulting food product to have the natural appearance of a larger food product. Furthermore, the constituent food products are arranged with consistent contours, such as muscle striations and the like, such that the resulting larger food product presents a still more realistic appearance. Still further, by ensuring and, where necessary, creating sufficiently large contact surfaces between the constituent smaller food products, the invention ensures that the resulting food product will maintain a unitary configuration.

Accordingly, it is particularly important the one appreciate that the present invention has been shown and described with reference to certain preferred embodiments that merely exemplify the broader invention revealed herein. Certainly, those skilled in the art can conceive of alternative embodiments. For instance, those with the major features or steps of the invention in mind could craft embodiments that incorporate those major features or steps while not incorporating all of the features or steps included in the preferred embodiments. With the foregoing in mind, the following claims are intended to define the scope of protection to be afforded the inventor, and those claims shall be deemed to include equivalent constructions insofar as they do not depart from the spirit and scope of the present invention.

It should be noted that a plurality of the following claims express certain elements as a means for performing a specific function, at times without the recital of structure or material. As the law demands, these claims shall be construed to cover not only the corresponding structure and material expressly described in the specification but also equivalents thereof.

I claim as deserving the protection of United States Letters Patent:

1. A larger food product formed from plural smaller food products, the larger food product comprising:
   a first food product with at least one edge surface; and
   a second food product with at least one edge surface joined with the first food product;
   wherein the first food product and the second food product are joined at their at least one edges whereby the first food product and the second food product are joined in a coplanar arrangement and whereby the first food product and the second food product together form a unitary larger food product;
   wherein the larger food product comprises a shrimp product;
   wherein the first food product comprises a mother shrimp with a proximal end, a distal end, and a body portion with a centerline; and
   wherein the second food product comprises a first child product with a proximnal end, a distal end, and a body portion wherein the mother shrimp and first child product are joined in an effectively coplanar arrangement and whereby the mother shrimp and the first child product together form the larger shrimp product.

2. The larger food product of claim 1 wherein the first food product and the second food product are joined by an edible binder or bonding agent.

3. The larger food product of claim 2 wherein the edible binder or bonding agent is chosen from the group consisting of guar gum, locust bean gum, Carrageenan gum, pectin, gum arabic, gum acacia, agar, cellulose derivatives such as carboxymethyl cellulose, cornstarch, potato starch, wheat starch, tapioca, egg albumen, cereals, dextrose, heat-coagulable proteins, water, alginates, and a combination of thrombin and blood plasma.

4. The larger food product of claim 1 wherein:
   the larger food product comprises a butterflied larger shrimp product;
   the first food product comprises a mother shrimp with a proximal end and a distal end prepared in a butterfly configuration by a dorsal butterfly slit along a portion of a centerline of the mother shrimp wherein the mother shrimp has a first butterfly half disposed on an opposite side of the centerline from a second butterfly half wherein a distal portion of the centerline is split thereby to allow at least a distal portion of the first and second butterfly halves to be separated from one another to form an open area;
   the second food product comprises a first child product disposed in the open area between the first and second butterfly halves wherein the first child product is joined with the mother shrimp whereby the mother shrimp and first child product are joined in a coplanar arrangement and whereby the mother shrimp and the first child product together form the butterflied larger shrimp product.

5. The larger food product of claim 4 wherein the first child product comprises a shrimp that is prepared in a butterfly configuration with first and second butterfly halves coupled along a centerline.

6. The larger food product of claim 5 wherein the centerline of the first child product is generally aligned with the centerline of the mother shrimp.

7. The larger food product of claim 4 wherein the open area between the first and second butterfly halves of the mother shrimp has the shape of a wedge of a given size and wherein the first child product comprises a wedge-shaped product with a size approximately equal to the size of the open area between the first and second butterfly halves.

8. The larger food product of claim 7 wherein the first child product is quasi-T-shaped with first and second legs and a wedge-shaped base wherein the base comprises the wedge-shaped product disposed between the first and second butterfly halves and wherein the first and second legs of the quasi-T-shaped first child product overly the distal ends of the first and second butterfly halves of the mother shrimp whereby the larger food product simulates a shrimp that is wider and longer than the mother shrimp.

9. The larger food product of claim 4 further comprising at least a third food product that comprises a second child product.

10. The larger food product of claim 1 wherein:
    the larger food product comprises a peeled-round larger shrimp product;
    the first food product comprises a mother shrimp with a proximal end, a distal end, and a body portion with a centerline wherein the mother shrimp is prepared in a peeled-round configuration by a removal of at least a portion of a shell of the mother shrimp; and
    the second food product comprises a first child product with a proximal end, a distal end, and a body portion wherein the proximal end of the second food product is joined to the distal end of the first food product whereby the mother shrimp and first child product are joined in an endwise, effectively coplanar arrangement and whereby the mother shrimp and the first child product together form the peeled-round larger shrimp product.

11. The larger food product of claim 10 wherein the second food product comprises a shrimp with a centerline.

12. The larger food product of claim 11 wherein the first and second food products are joined with the centerline of the first food product aligned with the centerline of the second food product.

13. The larger food product of claim 12 further comprising at least a third food product that comprises a shrimp with a centerline wherein the centerlines of the first, second, and third food products are aligned.

14. The larger food product of claim 10 wherein the distal end of the first food product is sloped relative to the body portion of the first food product whereby the first food product presents a greater surface area for joining with the second food product.

15. The larger food product of claim 14 wherein the proximal end of the second food product is sloped relative to the body portion of the second food product whereby the second food product presents a greater surface area for joining with the first food product.

16. The larger food product of claim 15 wherein the distal end of the first food product and the proximal end of the second food product are sloped at approximately complementary angles whereby the body portions of the first and second food products are disposed in an aligned relationship.

17. The larger food product of claim 16 wherein the second food product comprises a shrimp with a centerline and wherein the first and second food products are joined with the centerline of the first food product aligned with the centerline of the second food product.

18. The larger food product of claim 1 wherein:
    the larger food product comprises a shell-on larger shrimp product;
    the first food product comprises a mother shrimp with a proximal end, a distal end, and a body portion with a centerline wherein the mother shrimp is prepared in a shell-on configuration; and the second food product comprises a first child shrimp with a proximal end, a distal end, and a body portion with a centerline wherein the first child shrimp is prepared in a shell-on configuration;

wherein the proximal end of the second food product is joined to the distal end of the first food product whereby the mother shrimp and first child shrimp are joined in an endwise, effectively coplanar arrangement and whereby the mother shrimp and the first child shrimp together form the shell-on larger shrimp product.

19. The larger food product of claim 18 wherein at least a portion of the distal end of the first food product is sloped relative to the body portion of the first food product whereby the first food product presents a greater surface area for joining with the second food product.

20. The larger food product of claim 18 wherein at least the proximal end of the second food product is sloped relative to the body portion of the second food product whereby the second food product presents a greater surface area for joining with the first food product.

21. The larger food product of claim 20 wherein the sloped portions of the distal end of the first food product and the proximal end of the second food product are sloped at approximately complementary angles whereby the body portions of the first and second food products are disposed in an aligned relationship.

22. The larger food product of claim 21 wherein the distal end of the first food product and the proximal end of the second food product are correspondingly shaped in a male/female conical arrangement whereby a cone of the conical arrangement can matingly join with a conical depression of the conical arrangement for joining the first and second food products.

23. The larger food product of claim 22 wherein the distal end of the first food product is formed into a cone and the proximal end of the second food product has a conical depression formed therein.

24. The larger food product of claim 21 further comprising at least a third food product that comprises a shrimp with a centerline wherein the centerlines of the first, second, and third food products are aligned.

25. A butterflied larger shrimp product formed from plural smaller food products, the larger shrimp product comprising:

a mother shrimp with a proximal end and a distal end prepared in a butterfly configuration by a dorsal butterfly slit along a portion of a centerline of the mother shrimp wherein the mother shrimp has a first butterfly half disposed on an opposite side of the centerline from a second butterfly half;

wherein a distal portion of the centerline is split thereby to allow at least a distal portion of the first and second butterfly halves to be separated from one another to form an open area;

a first child product disposed in the open area between the first and second butterfly halves wherein the first child product is joined with the mother shrimp;

whereby the mother shrimp and first child product are joined in a coplanar arrangement and whereby the mother shrimp and the first child product together form a butterflied larger shrimp.

26. The butterflied larger shrimp of claim 25 wherein the first child product comprises a shrimp product wherein the shrimp product is prepared in a butterfly configuration with first and second butterfly halves coupled along a centerline.

27. The butterflied larger shrimp of claim 26 wherein the centerline of the first child product is generally aligned with the centerline of the mother shrimp.

28. A method for making a larger food product formed from plural smaller food products comprising the steps of:

providing a first food product with at least one edge surface;

providing a second food product with at least one edge surface;

joining the first and second food products with at least a portion of the at least one edge surface of the first food product joined to the at least one edge surface of the second food product by application of an edible binder therebetween;

thereby joining the first food product and the second food product in an effectively coplanar arrangement and thereby forming the first food product and the second food product into a unitary larger food product.

29. The method for making a larger food product of claim 28 wherein the larger food product simulates a naturally occurring food product wherein the step of providing a first food product comprises the step of providing a first food product comprising a first portion of the larger food product and wherein the step of providing the second food product comprises the step of providing a second food product comprising a second portion of the larger food product wherein the first and second food portions are complementary.

30. The method for making a larger food product of claim 28 wherein:

the larger food product comprises a butterflied larger shrimp product;

the step of providing the first food product comprises the steps of providing a mother shrimp with a proximal end and a distal end prepared in a butterfly configuration by making a dorsal butterfly slit along a portion of a centerline of the mother shrimp to form a first butterfly half disposed on an opposite side of the centerline from a second butterfly half, splitting a distal portion of the centerline, and separating at least a distal portion of the first and second butterfly halves from one another to form an open area;

the step of providing the second food product comprises the steps of providing a first child product and disposing the first child product at least partially in the open area between the first and second butterfly halves of the mother shrimp; and the step of joining the first and second food products comprises securing the first child product at least partially in the open area between the first and second butterfly halves of the mother shrimp thereby joining the mother shrimp and first child product in a coplanar arrangement to form the butterflied larger shrimp product.

31. The method for making a larger food product of claim 30 wherein the step of providing the first child product comprises providing a shrimp prepared in a butterfly configuration with first and second butterfly halves coupled along a centerline.

32. The method for making a larger food product of claim 31 further comprising the step of aligning the centerline of the first child product with the centerline of the mother shrimp.

33. The method for making a larger food product of claim 30 wherein the step of separating at least a distal portion of the first and second butterfly halves from one another to form an open area comprises separating the distal portion of the first and second butterfly halves to form a wedge-shaped open area of a given size and wherein the step of providing a first child product comprises providing a wedge-shaped product with a size approximately equal to the size of the open area and disposing the wedge-shaped product between the first and second butterfly halves.

34. The method for making a larger food product of claim 33 wherein the step of providing a first child product comprises providing a quasi-T-shaped product with first and second legs and a wedge-shaped base wherein the base comprises the wedge-shaped product disposed between the first and second butterfly halves and wherein the first and second legs of the quasi-T-shaped first child product overly the distal ends of the first and second butterfly halves of the mother shrimp whereby the larger food product simulates a shrimp that is wider and longer than the mother shrimp.

35. The method for making a larger food product of claim 28 wherein:

the larger food product comprises a peeled-round larger shrimp product;

the step of providing the first food product comprises providing a mother shrimp with a proximal end, a distal end, and a body portion with a centerline wherein the mother shrimp is prepared in a peeled-round configuration by removing at least a portion of a shell of the mother shrimp; and the step of providing the second food product comprises providing a first child product with a proximal end, a distal end, and a body portion;

the step of joining the first and second food products comprises joining the proximal end of the second food product to the distal end of the first food product whereby the mother shrimp and first child product are joined in an endwise, effectively coplanar arrangement and whereby the mother shrimp and the first child product together form the peeled-round larger shrimp product.

36. The method for making a larger food product of claim 35 wherein the step of providing the second food product comprises providing a shrimp with a centerline and wherein the step of joining the first and second food products further comprises joining the first and second food products with the centerline of the first food product aligned with the centerline of the second food product.

37. The method for making a larger food product of claim 35 wherein the step of providing the first food product comprises providing a first food product with a distal end that is sloped relative to the body portion of the first food product whereby the first food product presents a greater surface area for joining with the second food product.

38. The method for making a larger food product of claim 35 wherein the step of providing the second food product comprises providing a second food product with a proximal end that is sloped relative to the body portion of the second food product whereby the second food product presents a greater surface area for joining with the first food product.

39. The method for making a larger food product of claim 38 wherein the steps of providing the first and second food products comprise providing a first food product with a distal end sloped at an approximately complementary angle to an angle at which the proximal end of the second food product is sloped whereby the body portions of the first and second food products are disposed in an aligned relationship.

40. The method for making a larger food product of claim 28 wherein:

the larger food product comprises a shell-on larger shrimp product;

the step of providing the first food product comprises the steps of providing a mother shrimp with a proximal end, a distal cud, and a body portion with a centerline and preparing the mother shrimp in a shell-on configuration; and the step of providing the second food product comprises the steps of providing a first child shrimp with a proximal end, a distal end, and a body portion with a centerline and preparing the first child shrimp in a shell-on configuration; and the step of joining the first and second food products comprises joining the proximal end of the second food product to the distal end of the first food product whereby the mother shrimp and first child shrimp are joined in an endwise, effectively coplanar arrangement and whereby the mother shrimp and the first child shrimp together form the shell-on larger shrimp product.

41. The method for making a larger food product of claim 40 wherein the step of providing the first food product comprises providing a first food product with at least a portion of the distal end of the first food product sloped relative to the body portion of the first food product whereby the first food product presents a greater surface area for joining with the second food product.

42. The method for making a larger food product of claim 41 wherein the step of providing the second food product comprises providing a second food product with at least a portion of the proximal end of the second food product sloped relative to the body portion of the second food product whereby the second food product presents a greater surface area for joining with the first food product.

43. The method for making a larger food product of claim 42 wherein the steps of providing first and second food products further comprise providing first and second food products with sloped portions of the distal end of the first food product and the proximal end of the second food product sloped at approximately complementary angles whereby the body portions of the first and second food products are disposed in an aligned relationship.

44. The method for making a larger food product of claim 42 wherein the steps of providing first and second food products fisher comprise providing first and second food products with the distal end of the first food product and the proximal end of the second food product correspondingly shaped in a male/female conical arrangement whereby a cone of the conical arrangement can matingly join with a conical depression of the conical arrangement for joining the first and second food products.

* * * * *